Jan. 5, 1965  P. D. RIGTERINK  3,164,129
AUTOMATIC NEST GUARD

Filed Feb. 15, 1960  2 Sheets-Sheet 1

INVENTOR
PRESTON D. RIGTERINK

BY *Price and Heneveld*

ATTORNEYS

Jan. 5, 1965    P. D. RIGTERINK    3,164,129
AUTOMATIC NEST GUARD
Filed Feb. 15, 1960    2 Sheets-Sheet 2
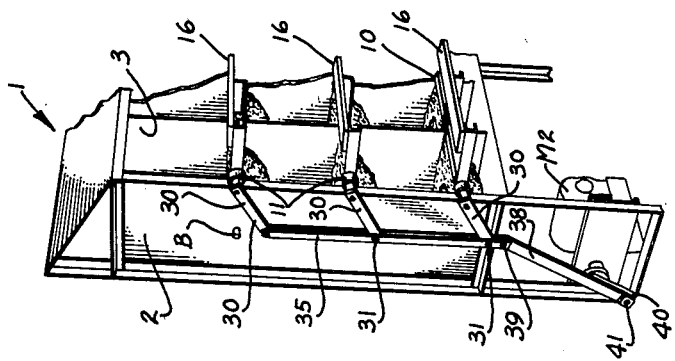
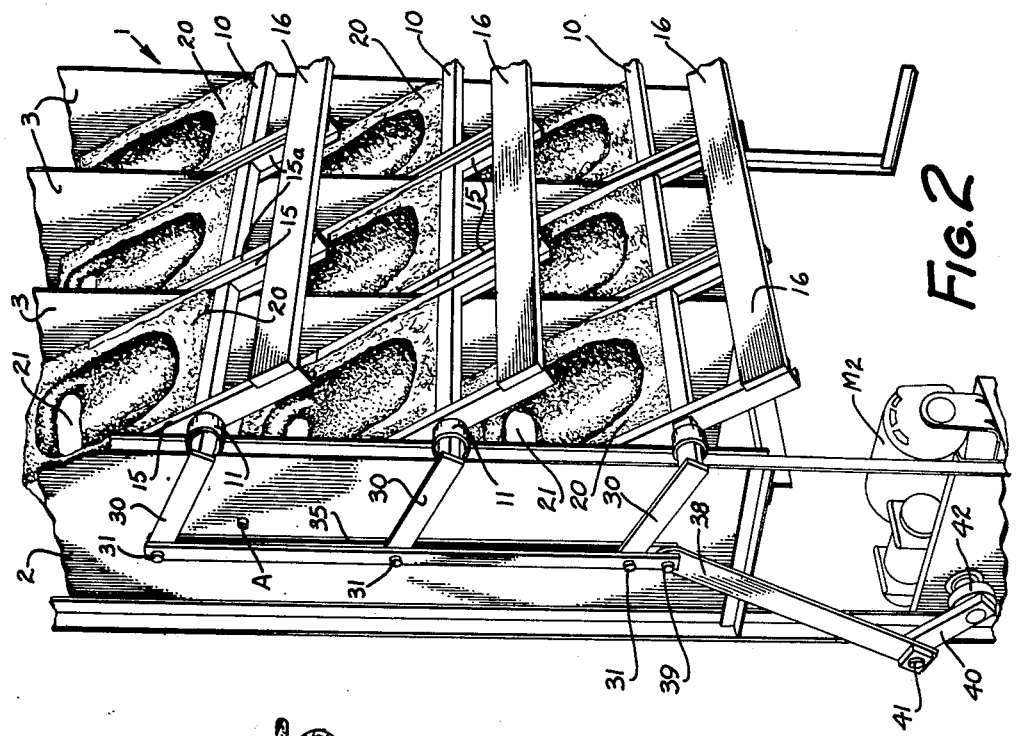
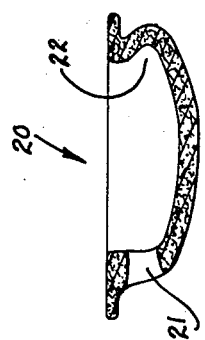
INVENTOR
PRESTON D. RIGTERINK
BY
ATTORNEYS

United States Patent Office 3,164,129
Patented Jan. 5, 1965

3,164,129
AUTOMATIC NEST GUARD
Preston D. Rigterink, Holland, Mich., assignor to Automatic Poultry Feeder Company, Zeeland, Mich., a corporation of Michigan
Filed Feb. 15, 1960, Ser. No. 8,793
13 Claims. (Cl. 119—45)

This invention relates to an automatic guard for chicken nests. More particularly, this invention relates to an apparatus adapted to prevent chickens from roosting in laying nests over night.

It is a well-known fact that chickens will tend to roost within laying nests over night. This is highly undesirable and no satisfactory means has been devised heretofore for automatically assuring that chickens will not remain in the laying nests over night. Apparatus is presently in existence utilizing a perch pivotally secured to the front of the nest, the perch being adapted to pivot upwardly to close the nest and prevent a chicken from entering therein. However, such a means is not satisfactory for the problem at hand because chickens in the nests at the time the perch is pivoted in front of them are unable to escape and are therefore forced to remain in the nests until the perch is pivoted downwardly.

It is therefore an object of this invention to provide a chicken nest assembly of a type adapted to prevent a chicken from roosting in a laying nest over night.

Another object of this invention is to provide such a chicken nest assembly which both removes chickens from the nests and prevents them from re-entering them.

Another object of this invention is to provide such a chicken nest assembly which automatically removes chickens from the nests at a predetermined time, prevents a chicken from entering therein for a predetermined interval of time and allows a chicken to re-enter the nest at the end of this predetermined interval.

Another object of this invention is to provide a chicken nest assembly which is especially well adapted to work in combination with means for automatically conveying eggs from the nests at the time they are laid in the nests.

A still further object of this invention is to provide a chicken nest assembly as described which is simple in construction and safe in its handling of the chickens and the eggs.

These and other objects of this invention will become obvious to those skilled in the poultry art upon reading the following specification in conjunction with the attached drawings wherein:

FIG. 2 is a front, perspective, view of the nest structure of this invention, the nests being closed and certain parts being broken away to better show the invention;

FIG. 3 is a view similar to FIG. 2, the nests being open;

FIG. 6 is a cross sectional view of one of the nests forming a part of this invention.

Briefly, this invention relates to a chicken nest assembly of the type having a pair of end walls and a plurality of spaced partitions therebetween forming nesting compartments. At least two horizontally positioned rods are pivotally secured at their ends to these end walls. A plurality of bars are secured to and spaced along each of these rods, a pair of such bars extending from each rod between an end wall and a partition and between each pair of partitions. A nest is secured between each pair of bars. A link is secured to an end of each of the rods, and a movable member is pivotally secured to the other ends of the links. Means is provided for moving the member whereby the rods are rotated and in one position the nests are positioned generally horizontally between the partitions and in another position the nests are positioned generally vertically therebetween. The means for moving the member includes a motor having a shaft operably connected to the member described, an energizing circuit for the motor and a time clock dominating this circuit. Thereby, the member may be automatically moved between its two positions at predetermined intervals, the system thereby being completely automatic. Such structure is especially well adapted to be used with conveying means behind the housing which carries eggs away from the nests, since one is then assured that no eggs are in the nests when the chickens are removed therefrom and the nests closed for the night.

Figure 1:
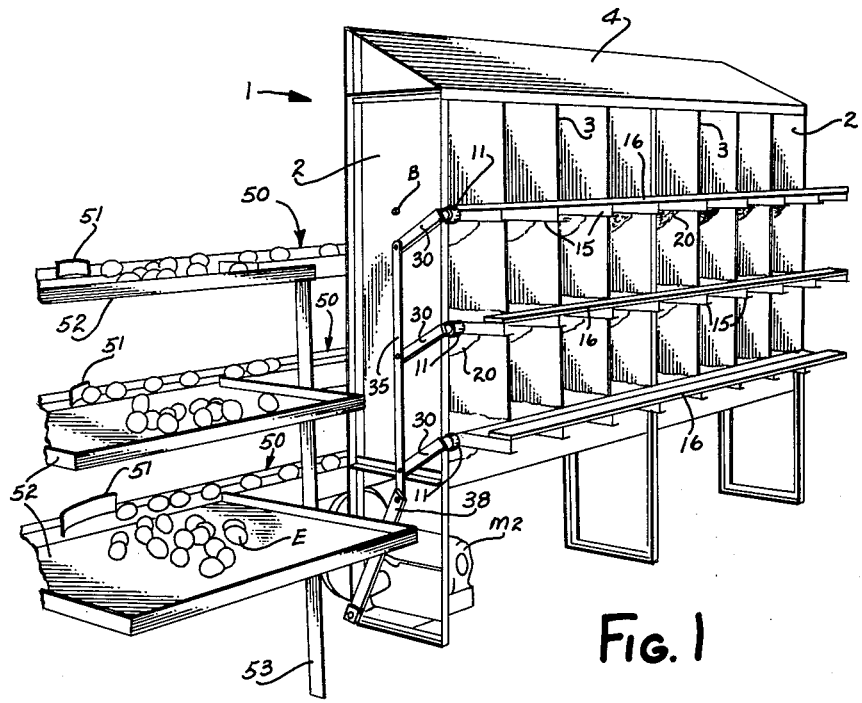
FIG. 1 is a front, perspective view of the chicken nest assembly comprising this invention.

Referring specifically to the drawings, the reference numeral 1 designates a housing for a chicken nest assembly, having end walls 2 and a plurality of partitions 3 therebetween (FIGS. 1 and 2). The top 4 of this housing is sloped to prevent chickens from standing thereon. A plurality of rods 10 are positioned horizontally along the front of the housing 1, the rods 10 rotatably mounted in the collars 11 on the edges of end walls 2. Secured to each rod 10 are a plurality of bars 15 which are spaced along the rods 10, two of the bars 15 extending between the compartments formed within the housing 1 by the partitions 3. The bars are adjacent each partition and end wall and their other terminal portions 15a extend beyond the rods 10 whereby perchs 16 may be mounted thereon. Nests 20 are secured to the bars 15 lying within the housing 1 between the partitions 3. These nests may be formed to receive a chicken and preferably include an opening 21 in the lower rear portion thereof, the purpose of which will be more fully explained hereinafter (FIG. 6). Also, each nest 20 includes a pocket 22 at the inner front portion thereof. Each nest is preferably fabricated of steel together with a light-weight fibrous material, which is both durable and easily moved within the housing 1.

Secured to an end of each rod 10 are the links 30. A pair of switches A and B are mounted on an end wall 2 of housing 1 as shown in FIGS. 2 and 3. Switches A and B are normally closed and are positioned in the path of a link 30 and are adapted to be opened when depressed by the link, the purpose of the switches being fully explained hereinafter. A pivot pin 31 pivotally secures each of the links 30 to a movable member 35 which comprises a pair of elongated bars, one at each side of the links 30. A connecting bar 38 is pivotally secured to the lower end of the movable member 35 by means of the pivot pin 39. A second connecting bar 40 is pivotally secured to the other end of the first connecting bar 38 by means of the pivot pin 41. The lower end of the second connecting bar 40 is pivotally secured to the end of the driving shaft 42 of the motor $M_2$.

Thus, as the motor $M_2$ operates and the shaft 42 rotates the second connecting bar 40 will also rotate. This will cause the first connecting bar 38 to be raised and lowered which in turn moves the member 35 up and down. Movement of the links 30 actuates switches A and B and causes the rod 10 to rotate within the collars 11. This in turn moves the nests 20 from a position allowing a chicken to sit therein (FIGS. 1 and 3) to a position removing a chicken from the nest and preventing re-entrance into the nest (FIG. 2).

Turning to FIG. 1, a plurality of conveying means 50 are positioned behind the housing 1. Each conveying means 50 is positioned at a height such that it communicates with the openings 21 in the lower rear portion of the nests 20, and is of a type having an endless, driven conveyor member (not shown). Deflector plates 51 are positioned with respect to each conveying means 50 such that eggs E moving along the conveying means are moved to a tray 52, all of the trays 52 being supported by the standard 53. Thus, as eggs are laid in each nest 20, the will roll out of the opening 21 at the rear of the nest onto a conveying means 50. They will move along the conveying means 50, engage a deflector plate 51 and move onto a tray 52 where they can be collected in a minimum of time.

Figure 4:
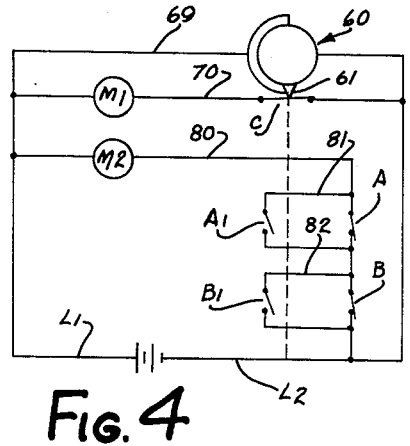
FIG. 4 is a wiring diagram of the control circuit for the system of this invention.

FIG. 4 is a circuit diagram showing the operation of the various parts of this chicken nest assembly. The lines $L_1$ and $L_2$ lead to a power source. The timer 60 is connected in line 69 between power lines $L_1$ and $L_2$. The motor $M_1$ which operates the conveying means 50 is connected in line 70 between power lines $L_1$ and $L_2$ and the motor $M_2$ operating the position of the nests 20 is connected in line 80 between power lines $L_1$ and $L_2$. Located in line 80 are the switches A and B, one of which is always in closed position, these switches being actuated by a link 30 as described hereinbefore. Bypass circuits 81 and 82 respectively bypass the switches A and B. Switches $A_1$ and $B_1$ are respectively located in bypass circuits 81 and 82.

Off-on switch C in line 70 is actuated by cam element 61 of the timer 60. The cam element 61 may be slidably adjusted so that switch C may remain closed for a predetermined length of time. Thus, each conveyor means 50 will remain continuously in operation during this predetermined length of time. The timer 60 also actuates switches $A_1$ and $B_1$ in bypass circuits 81 and 82 respectively. The operation of this apparatus will now be explained in detail and will be best understood from an examination of FIGS. 4 and 5.

Figure 5:
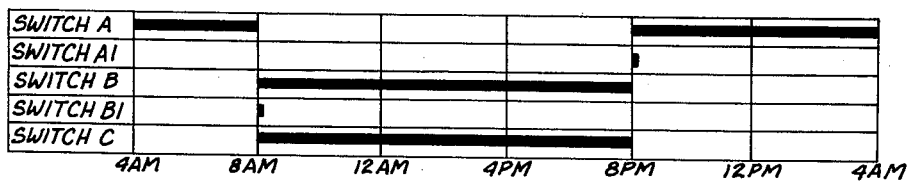
FIG. 5 is a time chart showing the relationship of the various switches in the system.

Looking first to the left of the chart shown in FIG. 5, it will be noted that in the early morning hours only switch A is closed, the link 30 holding switch B open. The nests 20 are in a position preventing chickens from entering thereinto and the conveying means 50 are not in operation. At 8:00 a.m. (this time merely being exemplary) switch $B_1$ is closed by the timer 60. Switch C is also closed at this time. Therefore, the motor $M_1$ will start and the conveying means 50 commence operation. Further, the motor $M_2$ is set in operation through the closed switches A and $B_1$. This actuates the movable member 35 which rotates the rods 10 through movement of links 31. As the links 31 move downwardly, switch A is opened and the motor $M_2$ is shut off as the circuit is broken. Thus, the nests 20 are positioned such that chickens may enter therein. All eggs deposited in the nests roll through the openings 21 in the lower rear portion thereof onto the conveying means 50 where they are taken for collection to the trays 52.

At 8:00 p.m. (time once again being exemplary) the timer 60 opens switch C and closes switch $A_1$, stopping motor $M_1$ and commencing operation of motor $M_2$. Thus, the conveying means 50 are stopped and each nest 20 moves upwardly through the operation of motor $M_2$, gently easing chickens out of the nests and preventing them from roosting therein. Any eggs which may be in the nests 20 at this time are prevented from falling out of the nests by the pockets 22. As links 31 move upwardly, positioning the nests 20 in a generally vertical position, switch B is opened. Again, the motor $M_2$ is shut off and will remain so until the cycle begins again the next morning.

This invention has provided a chicken nest assembly which positively prevents a chicken from roosting in a laying nest over night. Further, this chicken nest assembly both removes the chickens from the nests and prevents them from reentering them. The entire system is automatic in that the chickens are kept from the nests for a predetermined time and not allowed to re-enter until the next morning. This assembly is especially well adapted to work in combination with means for automatically conveying eggs from the nests as they are laid therein. When the nests are pivoted upwardly at night, there are no eggs in the nests to be broken. This chicken nest assembly is simple in construction and absolutely safe in its handling of the chickens.

While only one embodiment of this invention has been shown, it may be possible to practice the invention through the utilization of certain other embodiments than those shown. Such other embodiments are to be included within the spirit and scope of this invention unless the appended claims expressly state otherwise.

I claim:

1. In a poultry nest assembly including a plurality of individual nesting enclosures each including side and rear closure means and a nest forming bottom means, said nest forming bottom means being movably mounted within each of said enclosures, said nest forming bottom means in one operative nesting position lying within said enclosure providing support for poultry and in another position forming a barrier at the front of said enclosure to prevent poultry from nesting within said enclosure.

2. In the poultry nest assembly of claim 1 in which the nest forming bottoms are secured to a rod extending along each of said enclosures and means for rotating said rod whereby said nests move from a generally horizontal position within said enclosures to a generally vertical position therein.

3. A poultry nest assembly, comprising: a housing having a pair of end walls and a plurality of spaced partitions therebetween forming nesting compartments; at least two horizontally positioned rods pivotally secured at their ends to said end walls; a plurality of bars secured to and spaced along each of said rods, two of said bars extending into each of said nesting compartments; a nest secured between the pair of said bars extending into each of said nesting compartments; a link secured to an end of each of said rods; a movable member pivotally secured to the other ends of said links; and means for moving said member whereby said rods are rotated and in one position said nests are positioned generally horizontally between said partitions and in another position said nests are positioned generally vertically between said partitions.

4. A poultry nest assembly as defined in claim 3, said means for moving said member including a motor having a shaft operably connected to said member, an energizing circuit for said motor and a time clock dominating said circuit whereby said member may be moved between its two positions at predetermined intervals.

5. A poultry nest assembly, comprising: a housing having a pair of end walls and a plurality of spaced partitions therebetween forming nesting compartments; at least two horizontally positioned rods pivotally secured at their ends to said end walls; a plurality of bars secured to and spaced along each of said rods, two of said bars extending into each of said nesting compartments; a nest secured between the pair of said bars extending into each of said nesting compartments; conveying means positioned behind said housing; openings in each of said nests communicating with said conveying means; a link secured to an end of each of said rods; a movable member pivotally secured to the other ends of said links; and means for moving said member whereby said rods are rotated and in one position said nests are positioned generally horizontally between said partitions and in another position said nests are positioned generally vertically between said partitions, said means for moving said member including a motor having a shaft operably connected to said member, an energizing circuit for said motor and a time clock dominating said circuit whereby said member may be moved between its two positions at predetermined intervals.

6. A poultry nest assembly, comprising: a plurality of nesting enclosures formed of side and rear enclosure means and a nest forming bottom means and having front openings therein; a support on which each nest forming bottom means is mounted, said supports movable from an operative nesting position uncovering said front openings and permitting poultry to enter said enclosures to a position in which it forms a barrier substantially covering said openings; said nest forming bottom means thereby being movable in a fashion to eject poultry from said compartments.

7. A poultry nest assembly of claim 6 in which a pocket is formed in the front of each of said nest forming bottom means to prevent eggs from being dumped from said enclosures.

8. The poultry nest assembly of claim 6 in which is provided a means on the side of said nest assembly for simultaneously moving said nest forming bottom means from the inoperative nesting position uncovering said openings and permitting poultry to enter said enclosures to the barrier forming position substantially covering said openings, said nest forming bottom means thereby being movable in a fashion to eject poultry from said enclosures.

9. The poultry nest assembly of claim 6 in which there is provided an opening in the lower rear portion of each of said nest forming bottom means whereby eggs deposited therein may be received therethrough.

10. The poultry nest assembly of claim 6 in which there is provided an opening in the lower rear portion of each of said nest forming bottom means whereby eggs deposited therein may be received therethrough; and a pocket formed in the front of each said nests to prevent eggs from being dumped from said enclosures.

11. A nesting and hen ejecting device comprising an enclosure having a nest forming bottom means, opposed side wall means and a rear wall closure means cooperating to define a nest chamber having a normally front opening for ingress and egress of a fowl, one of said nest forming bottom means, side wall means or rear wall closure means being mounted for pivotal movement between an operative barrier-forming position in which said movable means is positioned substantially in the front opening to prevent entry of a fowl into said nest chamber and a normal nesting and enclosure-forming position in which a fowl is permitted entry into said nest chamber for laying eggs, said movable means in moving from said nesting and enclosure-forming position to said barrier-forming position constituting a means for ejecting a fowl from said enclosure; force application means operatively connected to said movable means for imparting ejecting movements to said movable means between said operative nesting and enclosure forming position and said operative barrier-forming position to eject the occupant outwardly through said open front and to provide a barrier against re-entry of a fowl into the nest chamber; said force application means also being adapted for subsequently causing said movable means to move to its operative nesting and enclosure forming position; and electrical control means for controlling the operation of said force application means.

12. A nesting and hen ejecting device comprising an enclosure having a nest forming bottom means, opposed side wall means and a rear wall closure means cooperating to define a nest chamber having a normally front opening for ingress and egress of a fowl, one of said nest forming bottom means, side wall means or rear wall closure means being mounted for movement between an operative barrier-forming position in which said movable means is positioned substantially in the front opening to prevent entry of a fowl into said nest chamber and a normal nesting and enclosure-forming position in which a fowl is permitted entry into said nest chamber for laying eggs, said movable means in moving from said nesting and enclosure-forming position to said barrier-forming position constituting a means for ejecting a fowl from said enclosure; force application means operatively connected to said movable means for imparting ejecting movements to said movable means between said operative nesting and enclosure forming position and said operative barrier-forming position to eject the occupant outwardly through said open front and to provide a barrier against re-entry of a fowl into the nest chamber; said force application means also being adapted for subsequently causing said movable means to move to its operative nesting and enclosure-forming position; and electrical control means including a timer for controlling the operation of said power operated means to determine periods during which fowl are permitted in said nest chamber.

13. A nesting and hen ejecting device comprising an enclosure having a nest forming bottom means, opposed side wall means and a rear wall closure means cooperating to define a nest chamber having a normally front opening for ingress and egress of a fowl, one of said nest forming bottom means, side wall means or rear wall closure means being mounted for pivotal movement between an operative barrier-forming position in which said movable means is positioned substantially in the front opening to prevent entry of a fowl into said nest chamber and a normal nesting and enclosure-forming position in which a fowl is permitted entry into said nest chamber for laying eggs, said pivotally movable means in pivoting from said nesting and enclosure-forming position to said barrier-forming position constituting a means for ejecting a fowl from said enclosure; force application means operatively connected to said movable means for imparting ejecting movements to said movable means between said operative barrier-forming position to eject the occupant outwardly through said open front and to provide a barrier against re-entry of a fowl into the nest chamber; said force application means also being adapted for subsequently causing said movable means to pivot to its operative nesting and enclosure forming position; and electrical control means for controlling the operation of said force application means.

References Cited by the Examiner
UNITED STATES PATENTS

| | | | |
|---|---|---|---|
| 69,392 | 10/67 | Blackman | 119—50 |
| 275,969 | 4/83 | Woodside | 217—36 |
| 1,013,233 | 1/12 | Stout et al. | 119—19 |
| 1,613,171 | 1/27 | Hoffman | 119—50 |
| 1,613,207 | 1/27 | Stuber | 119—45 |
| 1,686,099 | 10/28 | Miller | 217—64 |
| 1,748,349 | 2/30 | Ijams | 119—23 |
| 1,837,528 | 12/31 | Burri | 119—47 |
| 1,860,304 | 5/32 | Yuhas | 119—49 |
| 2,447,826 | 8/48 | Torie | 119—47 |
| 2,623,499 | 12/52 | King | 119—48 |
| 2,733,427 | 1/56 | Chandler | 119—49 |
| 2,745,379 | 5/56 | Schmidt | 119—48 |
| 2,876,738 | 3/59 | Wettendorf | 119—49 |

SAMUEL KOREN, *Primary Examiner.*
CARL W. ROBINSON, ALDRICH F. MEDBERY,
*Examiners.*

Disclaimer 3,164,129.—*Preston D. Rigterink*, Holland, Mich. AUTOMATIC NEST GUARD. Patent dated Jan. 5, 1965. Disclaimer filed Feb. 17, 1972, by the assignee, *U.S. Industries, Inc.*

Hereby enters this disclaimer to claims 11, 12 and 13 of said patent.

[*Official Gazette July 25, 1972.*]